(12) United States Patent
Kawasaki

(10) Patent No.: US 8,347,704 B2
(45) Date of Patent: Jan. 8, 2013

(54) APPARATUS AND METHOD FOR DETECTING TIRE HAVING DECREASED PRESSURE, AND PROGRAM FOR DETECTING TIRE HAVING DECREASED PRESSURE

(75) Inventor: Hiroaki Kawasaki, Ashiya (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 317 days.

(21) Appl. No.: 12/877,581

(22) Filed: Sep. 8, 2010

(65) Prior Publication Data

US 2011/0107828 A1    May 12, 2011

(30) Foreign Application Priority Data

Nov. 10, 2009    (JP) ................................. 2009-257393

(51) Int. Cl.
     *B60C 23/02*    (2006.01)
(52) U.S. Cl. .......................... 73/146.2; 73/146; 702/138
(58) Field of Classification Search .......................... None
     See application file for complete search history.

(56) References Cited

U.S. PATENT DOCUMENTS

| | | | | |
|---|---|---|---|---|
| 5,826,207 | A * | 10/1998 | Ohashi et al. | 701/36 |
| 5,839,801 | A * | 11/1998 | Ferguson | 303/191 |
| 7,117,074 | B2 * | 10/2006 | Sugisawa | 701/34.1 |
| 7,233,850 | B2 * | 6/2007 | Nakano et al. | 701/41 |
| 7,619,510 | B2 * | 11/2009 | Oshiro | 340/444 |
| 7,868,749 | B2 * | 1/2011 | Miyamoto et al. | 340/444 |
| 7,963,157 | B2 * | 6/2011 | Kawasaki et al. | 73/146 |

FOREIGN PATENT DOCUMENTS

JP    2008-129055 A    6/2008

\* cited by examiner

*Primary Examiner* — Lisa Caputo
*Assistant Examiner* — Jermaine Jenkins
(74) *Attorney, Agent, or Firm* — Birch, Stewart, Kolasch & Birch, LLP

(57) ABSTRACT

The detection apparatus includes means for detecting rotation speed information of the respective wheels of a vehicle; means for estimating, a frequency characteristic of the wheel rotation speed information; and means for determining, based on the estimated frequency characteristic, a tire having a decreased air pressure. The frequency characteristic estimate means includes, to a time-series signal including the wheel rotation speed information: means for time-series estimating a third order or more linear model parameter; means for generating pseudo input data; means for estimating, based on the estimated linear model parameter and the pseudo input data, output data to a linear model; means for identifying, based on the pseudo input data and the estimated output, a linear model parameter for which the order is reduced to a second order; and means for estimating, based on the identified parameter for which the order is reduced to the second order, a resonance frequency of a tire torsional direction. The decreased air pressure determination means is so configured as to determine a tire having a decreased air pressure based on the estimated resonance frequency of the tire torsional direction.

14 Claims, 5 Drawing Sheets

APPARATUS AND METHOD FOR DETECTING TIRE HAVING DECREASED PRESSURE, AND PROGRAM FOR DETECTING TIRE HAVING DECREASED PRESSURE

TECHNICAL FIELD

The present invention relates to an apparatus and a method for detecting a tire having a decreased pressure, and a program for detecting a tire having a decreased pressure by which a tire having a decreased pressure is detected based on the resonance frequency of the tire of a running vehicle.

BACKGROUND ART

One of factors required to allow an automobile to run safely is a tire air pressure. When the air pressure is lower than an appropriate value, the stable maneuverability or fuel consumption is deteriorated, which may cause a tire burst. Thus, Tire Pressure Monitoring System (TPMS) for detecting a tire having a decreased pressure to send an alarm to the driver to prompt an appropriate action is an important technique from the viewpoint of environment protection and driver safety.

A conventional alarm apparatus can be classified into two types of the direct detection-type one (direct TPMS) and the indirect detection-type one (indirect TPMS). The direct TPMS provides a pressure sensor in a tire wheel to thereby directly measure the tire pressure. The direct TPMS can detect a decrease in the pressure at a high accuracy but has a problematic fault-tolerance performance for example and thus is still disadvantageous in the technical and cost aspects.

On the other hand, the indirect TPMS is a method of estimating the air pressure based on the tire rotation information. The indirect TPMS can be further classified into the Dynamic Loaded Radius (DLR) method and the Resonance Frequency Mechanism (RFM) method. The DLR method is a method that uses a phenomenon according to which a tire having a decreased pressure in a running vehicle is collapsed and thus the tire has a reduced dynamic loaded radius and is consequently rotated at a higher speed than other tires having a normal pressure. The DLR method compares the rotation rates of the four tires to thereby detect a tire having a decreased pressure. Since this method can use only wheel rotation speed signals obtained from a wheel speed sensor to subject the signals to a relatively-easy computation processing, this method has been widely researched mainly for the purpose of detecting a puncture of one wheel. However, this method merely makes a relative comparison among wheel rotation speeds and thus cannot detect a case where the four wheels simultaneous deflation (natural leakage). Furthermore, a disadvantage is caused where a decreased pressure cannot be accurately detected through all running conditions because a difference in the wheel speed is caused also by running conditions such as the turning of the vehicle, the acceleration and deceleration, and an eccentric load.

On the other hand, the RFM method is a method to use a fact that a tire having a decreased pressure has a different wheel speed signal frequency characteristic to thereby detect a difference from a normal pressure. In contrast with the DLR method, the RFM method is an absolute comparison with the normal values of the respective wheels that are retained in advance. Thus, the RFM method also can detect a case of the four wheels simultaneous deflation. Thus, the RFM method attracts attentions as a better indirect detection method. However, the RFM method has a disadvantage where some running conditions cause strong noise for example and thus an estimated frequency value of a target domain is not robust against the vehicle speed and the road surface situation for example. The present invention relates to an apparatus for detecting a tire status based on the RFM method. Hereinafter, the basic principle of this method will be described in more detail.

When the vehicle is running, the tires receive a force from the road surface to thereby cause the torsional motion in the front-and-rear direction and the front-and-rear motion of the suspension, and these motions have a coupled resonance vibration. Since this resonance phenomenon also has an influence on the wheel rotation motion, a wheel speed signal obtained from a wheel sensor provided in the Anti-Lock Braking System (ABS) also includes information related to the resonance phenomenon. Furthermore, since the coupled resonance vibration is caused in a unique vibration mode due to the tire torsional rigidity, the excitation status thereof changes so as to depend only on a change in the air pressure constituting the tire physical characteristic and has a very small dependence on a change in the vehicle speed and a change in the road surface. Specifically, a decreased air pressure causes a change in the dynamics of the tire torsional motion. Thus, when the wheel speed signal is subjected to a frequency analysis, a peak of the coupled resonance vibration (resonance peak) appears at the lower frequency-side in the case of a decreased pressure than in the case of a normal pressure. This phenomenon appears, due to the above-described characteristic, independent from the tire or vehicle type, the running speed, or the road surface situation for example. Thus, the RFM method focuses on the resonance frequency and issues an alarm when the frequency is determined to be relatively lower than a reference frequency estimated during initialization. Thus, the resonance frequency must be estimated based on wheel speed signals obtained from the ABS provided in a vehicle. The present applicant has previously suggested a method of estimating a resonance frequency (Japanese Patent Application No. 2008-129055 (hereinafter referred to as "the invention of the prior application")).

SUMMARY OF INVENTION

Technical Problem

In the invention of the prior application, in order to effectively extract the characteristic of a specific frequency domain including a resonance peak, a multistage procedure as shown below is used.

First, wheel speed signals of time-series data are analyzed based on a high-order autoregressive (AR) model. Next, based on the AR model parameters estimated by the time-series analysis and the actual wheel speed signals used in the estimate, an input signal is recovered that can be assumed as the one having been given to the model. Then, this input signal and the output signal (wheel speed signal) are subjected to an appropriate signal processing such as a bandpass filter. Then, based on the second-order autoregressive moving average (ARMA) model, the system is determined.

Specifically, according to the invention of the prior application, as shown in FIG. 5, an operation is performed where input data is generated based on the estimated linear parameter and the wheel speed signal used for the estimate and the input/output data is used to reduce the order to the second order.

In order to generate input data, it is ideal that input data is generated by output data used for the estimate of linear parameters and the system is identified using the corresponding input/output data. In this case, a batch-like processing is required in which all output data used for the estimate is once stored in an internal memory.

For example, when 1000 pieces of output data y1 to Y1000 are used to estimate third-order linear parameters (a1, a2, and a3), u1 to u1000 are generated as an input based on these a1, a2, and a3 and y1 to y1000. Then, the input/output data of u1 to u1000 and y1 to y1000 is used to identify the system.

Generally, in order to accurately estimate linear parameters by means of time-series estimate, a certain number of pieces of (output) data is required.

However, it is generally difficult for an in-vehicle computer to have an internal memory having a sufficient capacity due to a cost limitation. Thus, it is not realistic to store all output data in the internal memory. To solve this, a method is used by which input data is generated not by output data used for the estimate of linear parameters but by output data obtained after the estimate of linear parameters to sequentially generate input data. Then, the input/output data is used to identify the system.

However, this method requires an assumption that the result of the time-series estimate is sufficiently convergent and linear parameters are estimated stably. Thus, in the situation where the system changes and linear parameters are not estimated stably, input data cannot be generated accurately, which causes a disadvantage where the system identification has a poor accuracy.

The present invention has been made in view of the situation as described above. It is an objective of the present invention to provide an apparatus and a method for detecting a tire having a decreased air pressure and a program for detecting a tire having a decreased air pressure by which an existing calculation resource can be used to identify a system accurately and a cost problem can be solved.

Solution to Problem

In accordance with a first aspect of the present invention, there is provided an apparatus for detecting a tire having a decreased air pressure (hereinafter simply also referred to as "detection apparatus") including:

a wheel rotation speed information detection means for detecting rotation speed information of the respective wheels of a vehicle;

a frequency characteristic estimate means for estimating, based on the wheel rotation speed information obtained by the wheel rotation speed information detection means, a frequency characteristic of the wheel rotation speed information; and a decreased air pressure determination means for determining, based on the estimated frequency characteristic, a tire having a decreased air pressure wherein the frequency characteristic estimate means includes, to a time-series signal including the wheel rotation speed information:

a parameter estimate means for performing a first step of time-series estimating a third order or more linear model parameter;

a pseudo input data generating means for performing a second step of generating pseudo input data;

an output data estimate means for performing a third step of estimating, based on the linear model parameter estimated in the first step and the pseudo input data generated in the second step, output data to a linear model;

a parameter identification means for performing a fourth step of identifying, based on the pseudo input data and the estimated output, a linear model parameter for which the order is reduced to a second order; and a resonance frequency estimate means for performing a fifth step of estimating, based on the identified parameter for which the order is reduced to the second order, a resonance frequency of a tire torsional direction, and wherein the decreased air pressure determination means is so configured as to determine a tire having a decreased air pressure based on the estimated resonance frequency of the tire torsional direction.

In the detection apparatus according to the first aspect of the present invention, in addition to the effect by the invention of the prior application (a resonance frequency of a tire torsional direction can be estimated stably and accurately without correcting the estimated resonance frequency depending on the vehicle speed or the magnitude of the vibration from the road surface), the same processing as that of the invention of the prior application can be performed sequentially to carry out the invention only with an existing calculation resource, thus solving the cost problem. Furthermore, the invention is free from an adverse effect in which an input must be estimated by an output different from that used to estimate a linear parameter.

Furthermore, steps after the second step are not required to be always performed at every sampling interval and a sequential processing can be performed to obtain the result at an arbitrary timing. Thus, when it is required to reduce a calculation processing load for example, the calculation load can be easily dispersed by performing one processing at the 100th sampling for example. Thus, the system operation can be maintained stably.

Furthermore, in accordance with a second aspect of the present invention, there is provided a detection apparatus including:

a wheel rotation speed information detection means for detecting rotation speed information for the respective wheels of a vehicle;

a wheel rotation acceleration information computing means for computing, based on the wheel rotation speed information obtained by the wheel rotation speed information detection means, wheel rotation acceleration information;

a frequency characteristic estimate means for estimating, based on the wheel rotation acceleration information computed by the wheel rotation acceleration information computing means, a frequency characteristic of the wheel rotation acceleration information; and a decreased air pressure determination means for determining, based on the estimated frequency characteristic, a tire having a decreased air pressure wherein the frequency characteristic estimate means includes, to a time-series signal including the wheel rotation acceleration information:

a parameter estimate means for performing a first step of time-series estimating a third order or more linear model parameter;

a pseudo input data generating means for performing a second step of generating pseudo input data;

an output data estimate means for performing a third step of estimating, based on the linear model parameter estimated in the first step and the pseudo input data generated in the second step, output data to a linear model;

a parameter identification means for performing a fourth step of identifying, based on the pseudo input data and the estimated output, a linear model parameter for which the order is reduced to a second order; and a resonance frequency estimate means for performing a fifth step of estimating, based on the identified parameter for which the order is reduced to the second order, a resonance frequency of a tire torsional direction, and wherein the decreased air pressure determination means is so configured as to determine a tire having a decreased air pressure based on the estimated resonance frequency of the tire torsional direction.

Also in the detection apparatus according to the second aspect of the present invention, as in the detection apparatus according to the first aspect, in addition to the effect by the invention of the prior application, the same processing as that of the invention of the prior application can be performed sequentially to carry out the invention only with an existing calculation resource, thus solving the cost problem. Furthermore, the invention is free from an adverse effect in which an input must be estimated by an output different from that used to estimate a linear parameter. Furthermore, since a time-series signal including rotation acceleration information having a smaller change than that of rotation speed information is subjected to a time-series estimate, a computation accuracy can be increased.

Since the estimate accuracy can be improved by correcting the resonance frequency based on the temperature near a tire, the apparatus desirably includes: a temperature sensor for detecting the temperature near the tire; and a correction means for correcting the estimated resonance frequency of the tire torsional direction based on the temperature information detected by the temperature sensor.

Since a limited calculation can be used resource effectively, the parameter estimate means is desirably configured so that a third order or more linear model parameter is time-series estimated by means of the least-squares method.

Furthermore, by a filtering processing, signal components other than a target can be removed and the time-series estimate can have an improved accuracy. Thus, the parameter identification means is desirably configured to, when identifying a second order linear model, subject the input data and output data to a filtering processing by a filter having a predetermined passband width.

Since a limited calculation resource can be used effectively, the parameter identification means is desirably configured to identify the second order linear model by means of the least-squares method.

In accordance with a third aspect of the resent invention, there is provided a method of detecting a tire having a decreased air pressure (hereinafter simply also referred to as "detection method") including:

a step of detecting rotation speed information of the respective wheels of a vehicle;

a step of estimating, based on the wheel rotation speed information obtained in the step of detecting the rotation speed information, a frequency characteristic of the wheel rotation speed information; and a step of determining, based on the estimated frequency characteristic, a tire having a decreased air pressure wherein the step of estimating the frequency characteristic includes:

a first step of time-series estimating, with regard to a time-series signal including the wheel rotation speed information, a third order or more linear model parameter;

a second step of generating pseudo input data;

a third step of estimating, based on the linear model parameter estimated in the first step and the pseudo input data generated in the second step, output data to a linear model;

a fourth step of identifying, based on the pseudo input data and the estimated output, a linear model parameter for which the order is reduced to a second order; and a fifth step of estimating, based on the identified parameter for which the order is reduced to the second order, a resonance frequency of a tire torsional direction, and wherein the step of determining a tire having a decreased air pressure is configured to determine, based on the estimated resonance frequency of the tire torsional direction, a tire having a decreased air pressure.

In the detection method according to the third aspect of the present invention, in addition to the effect by the invention of the prior application, the same processing as that of the invention of the prior application can be performed sequentially to carry out the invention only with an existing calculation resource, thus solving the cost problem. Furthermore, the invention is free from an adverse effect in which an input must be estimated by an output different from that used to estimate a linear parameter.

Furthermore, steps after the second step are not required to be always performed at every sampling interval and a sequential processing can be performed to obtain the result at an arbitrary timing. Thus, when it is required to reduce a calculation processing load for example, the calculation load can be easily dispersed by performing one processing at the 100th sampling for example. Thus, the system operation can be maintained stably.

In accordance with a fourth aspect of the present invention, there is provided a detection method including:

a step of detecting rotation speed information of the respective wheels of a vehicle;

a step of computing, based on the wheel rotation speed information obtained in the step of detecting the rotation speed information, wheel rotation acceleration information;

a step of estimating, based on the wheel rotation acceleration information computed in the step of computing the wheel rotation acceleration information, a frequency characteristic of the wheel rotation acceleration information; and a step of determining, based on the estimated frequency characteristic, a tire having a decreased air pressure wherein the step of estimating the frequency characteristic includes:

a first step of time-series estimating, with regard to a time-series signal including the wheel rotation acceleration information, a third order or more linear model parameter;

a second step of generating pseudo input data;

a third step of estimating, based on the linear model parameter estimated in the first step and the pseudo input data generated in the second step, output data to a linear model;

a fourth step of identifying, based on the pseudo input data and the estimated output, a linear model parameter for which the order is reduced to a second order; and a fifth step of estimating, based on the identified parameter for which the order is reduced to the second order, a resonance frequency of a tire torsional direction, and wherein the step of determining a tire having a decreased air pressure is configured to determine, based on the estimated resonance frequency of the tire torsional direction, a tire having a decreased air pressure.

Also in the detection method according to the fourth aspect of the present invention, as in the detection method according to the third aspect, in addition to the effect by the invention of the prior application, the same processing as that of the invention of the prior application can be performed sequentially to carry out the invention only with an existing calculation resource, thus solving the cost problem. Furthermore, the invention is free from an adverse effect in which an input must be estimated by an output different from that used to estimate a linear parameter. Furthermore, a time-series signal including rotation acceleration information having a smaller change than that of rotation speed information is subjected to a time-series estimate. Thus, the computation accuracy can be increased.

Since the estimate accuracy can be improved by correcting the resonance frequency based on the temperature near a tire, the method desirably further includes a step of correcting, based on the temperature information from a temperature sensor for detecting the temperature near the tire, the estimated resonance frequency of the tire torsional direction.

Since a limited calculation resource can be used effectively, the first step desirably time-series estimates a third order or more linear model parameter by means of the least-squares method.

Furthermore, by a filtering processing, signal components other than a target can be removed and the time-series estimate can have an improved accuracy. Thus, when the fourth step identifies a second order linear model, the input data and output data is desirably subjected to a filtering processing by a filter having a predetermined passband width.

Since a limited calculation resource can be used effectively, the fourth step desirably identifies a second order linear model by means of the least-squares method.

In accordance with a fifth aspect of the present invention, there is provided a program for detecting a tire having a decreased air pressure (hereinafter also may be simply referred to as "program") which causes, in order to detect a tire of a running vehicle having a decreased air pressure based on a tire resonance frequency of the vehicle, a computer to function as: a frequency characteristic estimate means for estimating, based on wheel rotation speed information obtained by a wheel rotation speed information detection means for detecting rotation speed information of the respective wheels of a vehicle, a frequency characteristic of the wheel rotation speed information; and a decreased air pressure determination means for determining, based on the estimated frequency characteristic, a tire having a decreased air pressure wherein the frequency characteristic estimate means includes, to a time-series signal including the wheel rotation speed information, a parameter estimate means for performing a first step of time-series estimating a third order or more linear model parameter;

a pseudo input data generating means for performing a second step of generating pseudo input data;

an output data estimate means for performing a third step of estimating, based on the linear model parameter estimated in the first step and the pseudo input data generated in the second step, output data to a linear model;

a parameter identification means for performing a fourth step of identifying, based on the pseudo input data and the estimated output, a linear model parameter for which the order is reduced to a second order; and a resonance frequency estimate means for performing a fifth step of estimating, based on the identified parameter for which the order is reduced to the second order, a resonance frequency of a tire torsional direction, and wherein the decreased air pressure determination means is so configured as to determine a tire having a decreased air pressure based on the estimated resonance frequency of the tire torsional direction.

In accordance with a sixth aspect of the present invention, there is provided a program which causes, in order to detect a tire of a running vehicle having a decreased air pressure based on a tire resonance frequency of the vehicle, a computer to function as: a wheel rotation acceleration information computing means for computing, based on the wheel rotation speed information obtained by a wheel rotation speed information detection means for detecting a rotation speed information of respective wheels of a vehicle, wheel rotation acceleration information; a frequency characteristic estimate means for estimating, based on the wheel rotation acceleration information computed by the wheel rotation acceleration information computing means, a frequency characteristic of the wheel rotation acceleration information; and a decreased air pressure determination means for determining, based on the estimated frequency characteristic, a tire having a decreased air pressure wherein the frequency characteristic estimate means includes, to a time-series signal including the wheel rotation acceleration information:

a parameter estimate means for performing a first step of time-series estimating a third order or more linear model parameter;

a pseudo input data generating means for performing a second step of generating pseudo input data;

an output data estimate means for performing a third step of estimating, based on the linear model parameter estimated in the first step and the pseudo input data generated in the second step, output data to a linear model;

a parameter identification means for performing a fourth step of identifying, based on the pseudo input data and the estimated output, a linear model parameter for which the order is reduced to a second order; and a resonance frequency estimate means for performing a fifth step of estimating, based on the identified parameter for which the order is reduced to the second order, a resonance frequency of a tire torsional direction, and wherein the decreased air pressure determination means is so configured as to determine a tire having a decreased air pressure, based on the estimated resonance frequency of the tire torsional direction.

Advantageous Effects of Invention

According to a detection apparatus and a method and a program of the present invention, a decreased air pressure alarming system can have a significantly-improved performance without increasing the calculation resource of an in-vehicle calculator.

DESCRIPTION OF EMBODIMENTS

The following section will describe in detail, with reference to the attached drawings, embodiments of a detection apparatus and a detection method and a program of the present invention.

Figure 1:
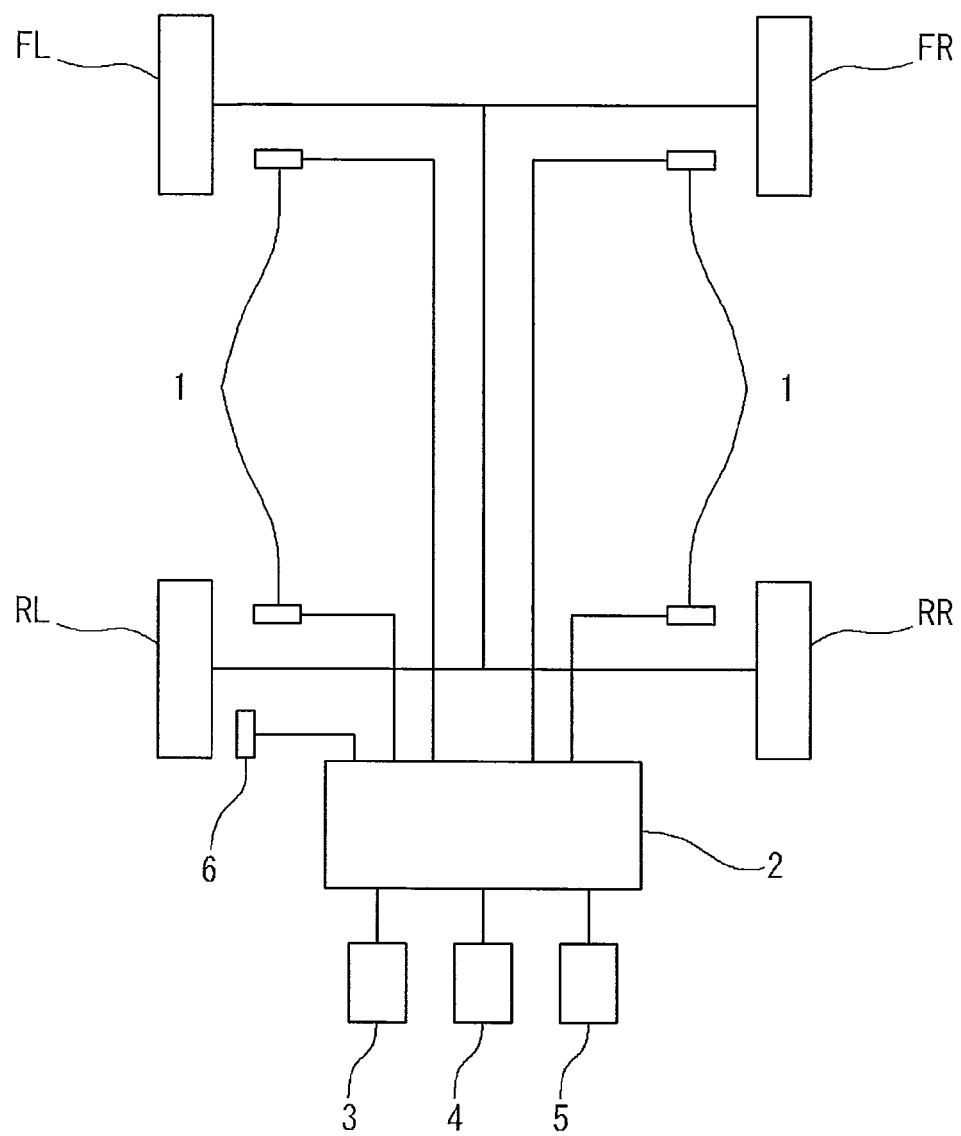
FIG. 1 is a block diagram illustrating one embodiment of a detection apparatus of the present invention.

As shown in FIG. 1, a detection apparatus according to one embodiment of the present invention includes normal wheel speed detection means (wheel rotation speed information detection means) 1 in order to detect the rotation speed information of a left front wheel (FL), a right front wheel (FR), of a left rear wheel (RL), and a right rear wheel (RR) of four tires attached to a four-wheel vehicle. The wheel speed detection means 1 is provided so as to be associated with the respective tires.

The wheel speed detection means 1 can be, for example, a wheel speed sensor that uses an electromagnetic pickup or the like to generate a rotation pulse to measure, based on the number of pulses, a rotation angular velocity and a wheel speed or an angular velocity sensor that uses the rotation as in dynamo to generate power to measure, based on this voltage, a rotation angular velocity and a wheel speed. The output from the wheel speed detection means 1 is given to a control unit 2 that is a computer such as ABS. This control unit 2 is connected, for example, to a display unit 3 configured by a liquid crystal display element, a plasma display element, CRT or the like for displaying a tire having a decreased pressure, an initialization button 4 that can be operated by a driver, an alarm unit 5 for notifying a driver of a tire having a decreased pressure, and a temperature sensor 6 for detecting the temperature near the tire.

Figure 2:
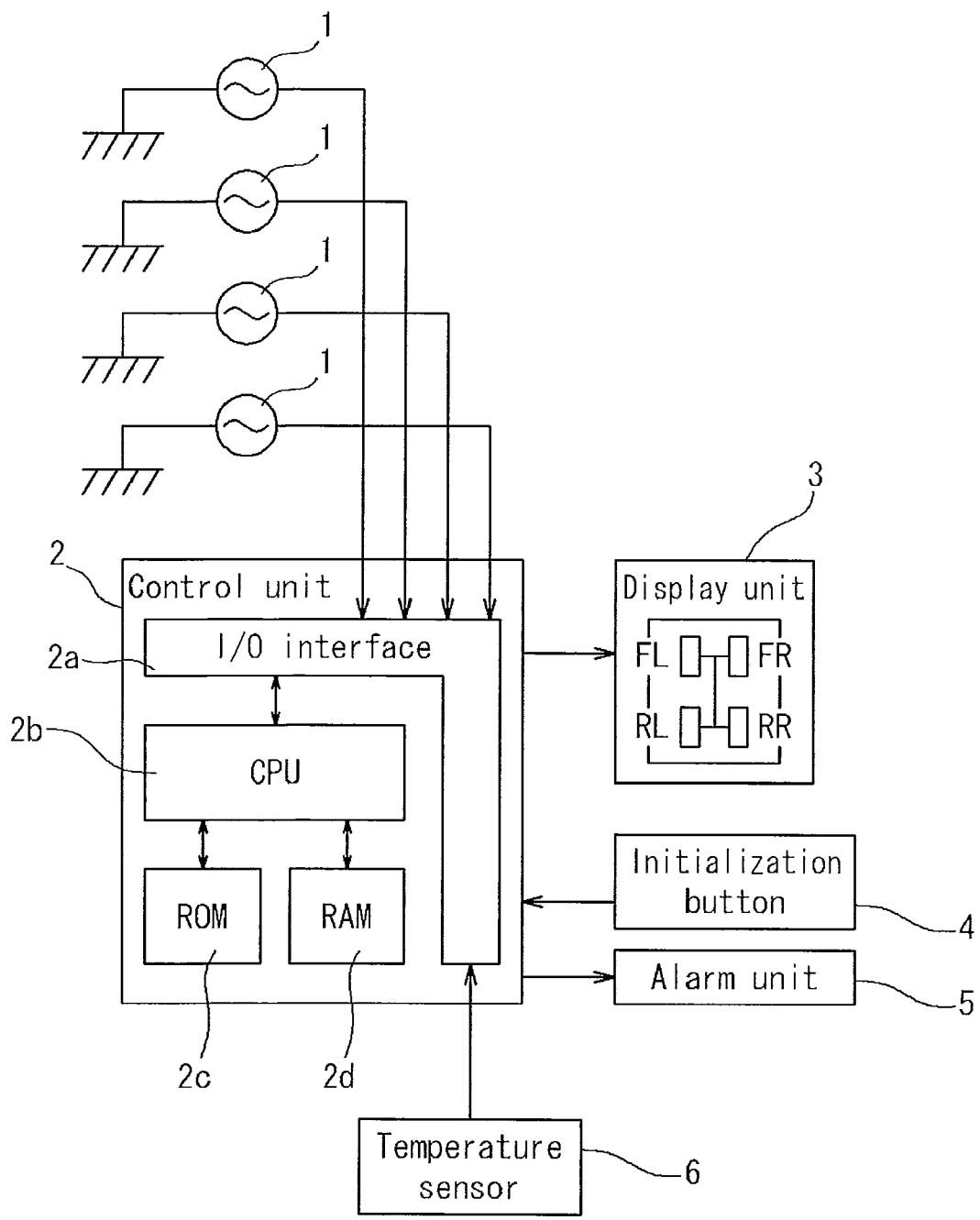
FIG. 2 is a block diagram illustrating an electric configuration of the detection apparatus shown in FIG. 1.
Figure 3:
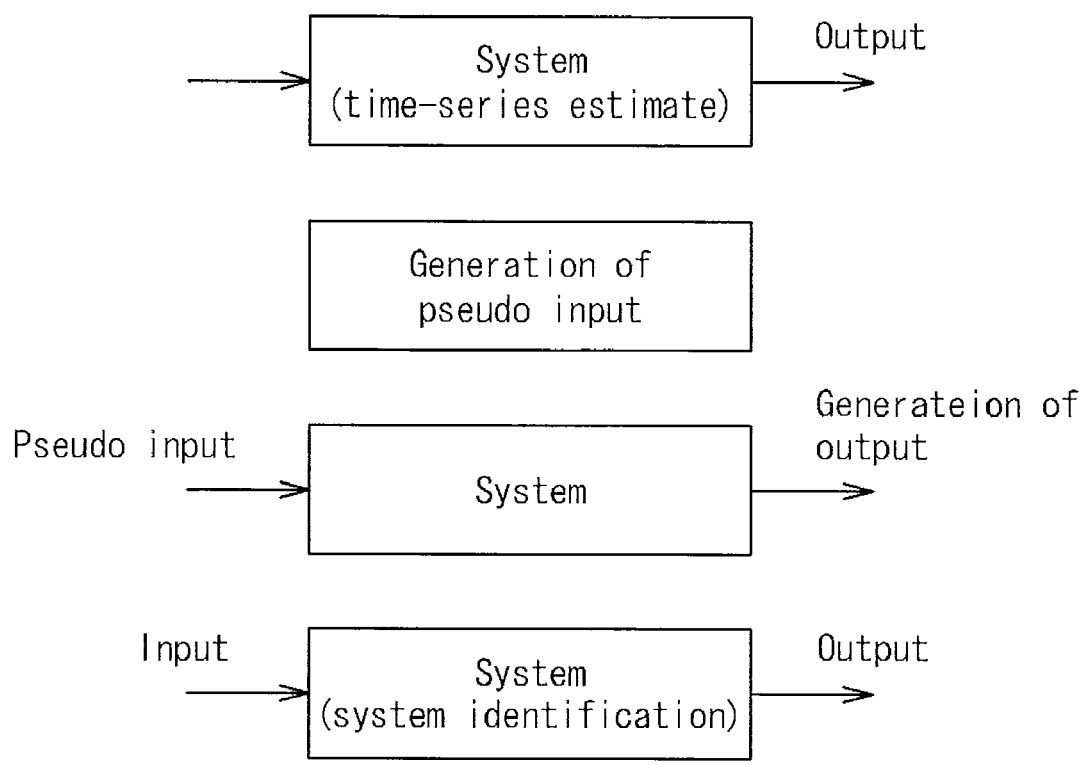
FIG. 3 illustrates the steps of a detection method of the present invention.

As shown in FIG. 2, the control unit 2 is composed of: an I/O interface 2a required for exchanging signals with an external apparatus; a CPU 2b functioning as a center of the computation processing; a ROM 2c storing therein a control operation program of this CPU 2b; and a RAM 2d in which data is temporarily written when the CPU 2b performs a control operation and from which the written data is read out.

The wheel speed detection means 1 outputs a pulse signal corresponding to the number of rotations of a tire (hereinafter also referred to as "wheel speed pulse"). Then, this wheel speed pulse can be sampled again at a predetermined sampling cycle $\Delta T$ (second) of $\Delta T=0.005$ seconds for example to thereby obtain the time-series data of wheel speed signals. Since a resonance frequency of a torsional direction of the target tire appears in the vicinity of tens of Hz, a sampling cycle must be set so that a Nyquist frequency includes it.

The detection apparatus of the present embodiment is mainly composed of: a wheel speed detection means (wheel rotation speed information detection means) 1; a frequency characteristic estimate means for estimating, based on the wheel rotation speed information obtained from the wheel speed detection means, the frequency characteristic of the wheel rotation speed information; and a decreased air pressure determination means for determining, based on the estimated frequency characteristic, a tire having a decreased air pressure. A program for detecting a tire having a decreased air pressure causes the control unit 2 to function as a frequency characteristic estimate means and a decreased air pressure determination means.

The frequency characteristic estimate means includes, to a time-series signal including the wheel rotation speed information: a parameter estimate means for performing a first step of time-series estimating a third order or more linear model parameter; a pseudo input data generating means for performing a second step of generating pseudo input data; an output data estimate means for performing a third step of estimating, based on the linear model parameter estimated in the first step and the pseudo input data generated in the second step, output data to a linear model; a parameter identification means for performing a fourth step of identifying, based on the pseudo input data and the estimated output, a linear model parameter for which the order is reduced to a second order; and a resonance frequency estimate means for performing a fifth step of estimating, based on the identified parameter for which the order is reduced to the second order, a resonance frequency of a tire torsional direction. The detection apparatus also includes a correction means for correcting, based on a temperature near a tire, the estimated resonance frequency.

In the detection apparatus according to the present embodiment, the decreased air pressure determination means is configured to determine a tire having a decreased air pressure based on the estimated resonance frequency of the tire torsional direction.

In the present invention, a wheel rotation signal of time-series data is used to once time-series estimate a linear model parameter of a high order (third order or more integer) to subsequently generate pseudo input data. Then, based on the estimated linear model parameter and the pseudo input data, an output to the linear model is estimated. Next, the estimated output and the pseudo input data are used to subject the linear model to system identification again. The following section will describe in detail the step of estimating a frequency characteristic that is a characteristic of the present invention.

[Frequency Characteristic Estimate Step]

Generally, in a problem in which an input and a system output corresponding to the input are given, the system behavior can be best approximated by determining a parameter of a model for which the input/output pair is assumed as data. On the other hand, in a problem in which only an output is obtained, the parameter is determined based on a model for which an input is assumed as white noise. A problem handled by the present invention models a physical phenomenon caused in a tire and determines the model parameter only based on the wheel rotation signal. Specifically, the latter method is used because a road surface stimulation assumed as an input cannot be obtained.

Since an actual wheel rotation signal includes various vibrations, it is general to use a filter that allows only a target frequency band to pass therethrough to thereby remove an excessive vibration component and the system is estimated based on the remaining vibration components. With regard to a target frequency, since a resonance component in the tire torsional direction depends on the tire internal pressure, such a filter is used that allows a band of tens of Hz to pass therethrough so that a resonance frequency is included at any internal pressure. A signal having passed through the filter includes only one resonance component. Thus, a second order linear model may be considered to be sufficient.

However, in a time-series estimate providing an output signal only, if there is applied such a filter that has a predetermined passband only to an output signal, the resultant signal tends to be drawn toward the filter center frequency and thus is disadvantageous in being dislocated from a true resonance point. The narrower the passband width is set, the more remarkably this tendency appears.

It is known that, although the resonance component in the tire torsional direction changes depending on the tire internal pressure, a vibration component included in the wheel rotation signal also changes depending on the vehicle speed or the concavity and convexity of the road surface for example. This consequently causes, when the filter has a wide passband width in order to avoid the dislocation from the resonance point, an insufficient removal of vibration components other than the torsional resonance, which causes a disadvantage of a decreased accuracy of the time-series estimate.

To solve this, in the present invention, a wheel rotation signal is used to estimate an AR model parameter of a high order (third order or more) to subsequently generate pseudo input data. Then, based on this pseudo input data and the parameter, output data to a linear model is estimated. Next, the estimated output and the pseudo input data are used to identify an ARMA model parameter of a second order.

Even when the order is reduced to a second order through a filter having a predetermined passband width such as a bandpass filter, the system can be estimated only with regard to a predetermined band without distorting the signals, by subjecting both of input and output signals to a filtering processing.

Furthermore, it is not easy to calculate, based on a high-order model parameter, a peak frequency in the vicinity of 40 Hz that is a resonance point in the tire torsional direction because such calculation causes a complicated computing processing. However, by reducing the order to a second order as in the present invention, the resonance point can be calculated easily.

Figure 4:
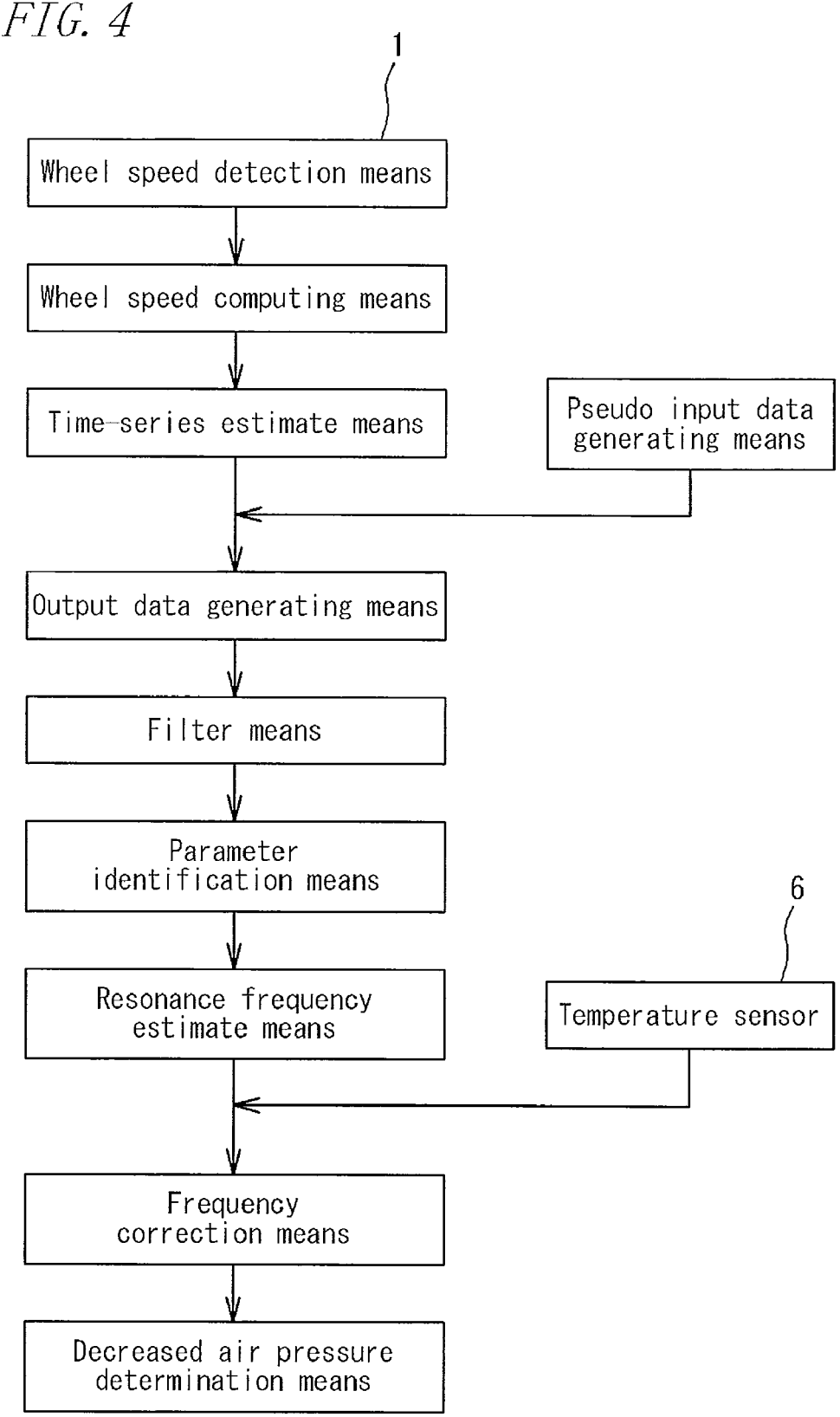
FIG. 4 is a block diagram illustrating the functional configuration of the detection apparatus according to one embodiment of the present invention.
Figure 5:
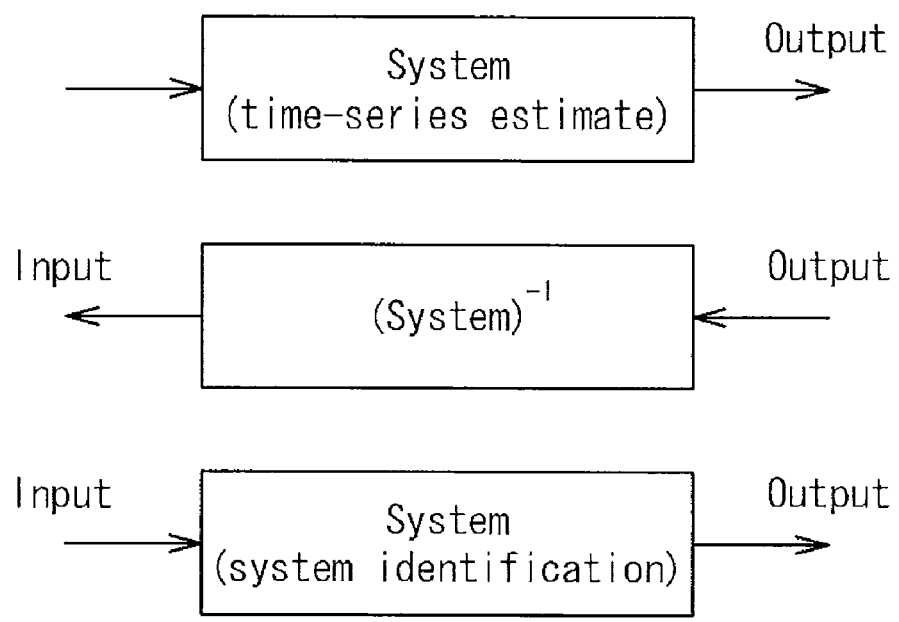
FIG. 5 illustrates the steps of a detection method of the invention of the prior application.

Next, the following section will describe the operation of the detection apparatus of the present embodiment in an order. FIG. 4 is a block diagram illustrating the functional configuration of the detection apparatus of the present embodiment.

(1) First, the wheel speed detection means is used to detect a wheel rotation signal.

(2) Next, the wheel speed computing means is used to sample the wheel rotation signal again with a predetermined cycle to thereby obtain a wheel speed signal. The cycle must be determined in consideration of the resonance frequency of the torsional direction of a target tire. Specifically, the sampling cycle is desirably 100 Hz or more because the resonance frequency of the torsional direction of the target tire appears in the vicinity of tens of Hz.

(3) Next, the resultant wheel speed is differentiated to obtain wheel acceleration. Although the wheel speed signal can be assumed as time-series data and can be subjected to a time-series analysis, since the wheel acceleration data has a smaller change than that of the wheel speed data, the wheel acceleration data is desirably assumed as time-series data from the viewpoint of improving the computation accuracy.

(4) Next, the computed wheel rotation acceleration data is assumed as time-series data and is subjected to a time-series analysis.

First, in the first step, the rotation acceleration data is assumed as time-series signal and the nth linear model of the following formula (1) (n is an integer of 3 or more) is subjected by the time-series estimate means to a time-series estimate of the respective parameters. The time-series estimate is desirably performed using the least-squares method in consideration of a computer resource.

$$y(k) = \sum_{i=1}^{n} a_i y(k-i) + w(k) \tag{1}$$

In the formula, y(k) denotes a time-series signal of wheel rotation acceleration, n denotes the order of the model (an integer of 3 or more), $a_i$ denotes each parameter, and w(k) denotes a disturbance.

(5) Next, in the second step, the pseudo input data generating means generates a pseudo white binary signal. A pseudo white binary signal can be generated by various methods and can be generally generated by the generation of M series. The M series of the cycle N=2n−1 can be generated by the following formula (2).

$$x_k = a_1 x_{k-1} \oplus a_2 x_{k-2} \oplus a_3 x_{k-3} \oplus \ldots \oplus a_n x_{k-n} \tag{2}$$

In the formula, ⊕ denotes an exclusive OR.

Xk (k=0, 1, ..., n−1) may have any initial value other than 0.

(6) Next, in the third step, the output data estimate means is used to estimate an output based on the respective parameters estimated in the first step and the pseudo input signal generated in the second step. Specifically, in the time-series estimate in the first step, an input to the system is defined as a disturbance w(k). This disturbance w(k) is assumed as a force applied from the road surface to a tire.

As shown in the following formula (3), the pseudo input signal generated in the second step is substituted in the disturbance w(k). The respective parameters estimated in the first step are used to estimate y(k) as an output signal. The initial value of y(k) is zero.

$$w(k) = y(k) - \sum_{i=1}^{n} a_i y(k-i) \tag{3}$$

(7) Next, in the fourth step, the parameter identification means identifies a second order ARMA model parameter based on the pseudo input signal generated in the second step and the output signal calculated (or estimated) in the third step. In this identification, a transfer function G(z) can be used that can be represented by the following formula (4).

$$G(z) = \frac{c_0 z^2 + c_1 z + c_2}{z^2 + b_1 z + b_2} \tag{4}$$

$$= \frac{c_0 + c_1 z^{-1} + c_2 z^{-2}}{1 + b_1 z^{-1} + b_2 z^{-2}}$$

In the formula, $z^{-1}$ denotes a one sample delay.

However, when the order is reduced to a second order, in order to focus on the resonance frequency of a target tire in particular, it is desirable that the input signal and the output signal are subjected to a filtering processing by a filter means having a predetermined passband width to subsequently identify the system.

(8) Next, in the fifth step, based on the model parameter for which the order is reduced to the second order, the resonance frequency is estimated by the resonance frequency estimate means. When the resonance characteristic is approximated to a continuous time second order model formula (5), the resonance frequency is represented by the following formula (6).

$$G(s) = \frac{\omega_n^2}{s^2 + 2\zeta\omega_n s + \omega_n^2} \tag{5}$$

$$\omega_p = \omega_n \sqrt{1 - 2\zeta^2} \tag{6}$$

In the formulae, $\omega_n$ denotes a natural frequency, $\zeta$ denotes an attenuation coefficient, and $\omega_p$ denotes a resonance frequency.

(9) Next, in the sixth step, based on temperature information from a temperature sensor for detecting the temperature near a tire (e.g., an in-vehicle ambient temperature sensor) for example, the frequency correction means corrects the estimated resonance frequency of the tire torsional direction. This is for the purpose of correcting a decreased resonance frequency caused when an increased temperature surrounding a tire causes a reduced hardness of rubber constituting the tire to consequently cause a reduced rigidity of the tire in the torsional direction. This is also for the purpose of correcting an increased resonance frequency caused when a reduced temperature surrounding the tire on the other hand causes an increased hardness of the rubber constituting the tire to consequently cause an increased rigidity of the tire in the torsional direction.

The most appropriate temperature information is temperature information regarding the side wall of the tire. However, other temperature information also can be used such as a tire ambient temperature or an external temperature. The resonance frequency can be corrected by the following formula (7) in which the estimated resonance frequency is $\omega_p$, a correction coefficient is $\alpha$, a corrected resonance frequency is $\omega_{pp}$, and a tire atmosphere temperature is Temp.

$$\omega_{pp} = \omega_p - \alpha \times T_{temp} \quad (7)$$

When the corrected resonance frequency is smaller than a predetermined value, it is determined that the tire air pressure is decreased and an alarm is issued to a driver. Another configuration also may be used where, when a tire is exchanged or when a tire air pressure is adjusted, an initialization button is provided in order to learn a resonance frequency of a tire torsional direction under a reference internal pressure and a value at the depression of the initialization button is learned and stored as a reference value and an air pressure decrease can be alarmed when the resonance frequency decreases from the reference value by a predetermined value or more.

The invention claimed is:

1. An apparatus for detecting a tire having a decreased air pressure comprising:
   a wheel rotation speed information detection means for detecting rotation speed information of the respective wheels of a vehicle;
   a frequency characteristic estimate means for estimating, based on the wheel rotation speed information obtained by the wheel rotation speed information detection means, a frequency characteristic of the wheel rotation speed information; and
   a decreased air pressure determination means for determining, based on the estimated frequency characteristic, a tire having a decreased air pressure
   wherein the frequency characteristic estimate means includes, to a time-series signal including the wheel rotation speed information:
   a parameter estimate means for performing a first step of time-series estimating a third order or more linear model parameter;
   a pseudo input data generating means for performing a second step of generating pseudo input data;
   an output data estimate means for performing a third step of estimating, based on the linear model parameter estimated in the first step and the pseudo input data generated in the second step, output data to a linear model;
   a parameter identification means for performing a fourth step of identifying, based on the pseudo input data and the estimated output, a linear model parameter for which the order is reduced to a second order; and
   a resonance frequency estimate means for performing a fifth step of estimating, based on the identified parameter for which the order is reduced to the second order, a resonance frequency of a tire torsional direction, and
   wherein the decreased air pressure determination means is so configured as to determine a tire having a decreased air pressure based on the estimated resonance frequency of the tire torsional direction.

2. An apparatus for detecting a tire having a decreased air pressure comprising:
   a wheel rotation speed information detection means for detecting rotation speed information for the respective wheels of a vehicle;
   a wheel rotation acceleration information computing means for computing, based on the wheel rotation speed information obtained by the wheel rotation speed information detection means, wheel rotation acceleration information;
   a frequency characteristic estimate means for estimating, based on the wheel rotation acceleration information computed by the wheel rotation acceleration information computing means, a frequency characteristic of the wheel rotation acceleration information; and
   a decreased air pressure determination means for determining, based on the estimated frequency characteristic, a tire having a decreased air pressure
   wherein the frequency characteristic estimate means includes, to a time-series signal including the wheel rotation acceleration information:
   a parameter estimate means for performing a first step of time-series estimating a third order or more linear model parameter;
   a pseudo input data generating means for performing a second step of generating pseudo input data;
   an output data estimate means for performing a third step of estimating, based on the linear model parameter estimated in the first step and the pseudo input data generated in the second step, output data to a linear model;
   a parameter identification means for performing a fourth step of identifying, based on the pseudo input data and the estimated output, a linear model parameter for which the order is reduced to a second order; and
   a resonance frequency estimate means for performing a fifth step of estimating, based on the identified parameter for which the order is reduced to the second order, a resonance frequency of a tire torsional direction, and
   wherein the decreased air pressure determination means is so configured as to determine a tire having a decreased air pressure based on the estimated resonance frequency of the tire torsional direction.

3. The apparatus of claim 1 of claim 2, wherein the apparatus further comprises a temperature sensor for detecting the temperature near the tire; and a correction means for correcting the estimated resonance frequency of the tire torsional direction based on the temperature information detected by the temperature sensor.

4. The apparatus of claim 1 or claim 2, wherein the parameter estimate means is configured so that a third order or more linear model parameter is time-series estimated by means of the least-squares method.

5. The apparatus of claim 1 or claim 2, wherein the parameter identification means is configured to, when identifying a second order linear model, subject the input data and output data to a filtering processing by a filter having a predetermined passband width.

6. The apparatus of claim 1 or claim 2, wherein the parameter identification means is configured to identify the second order linear model by means of the least-squares method.

7. A method of detecting a tire having a decreased air pressure including:
   a step of detecting rotation speed information of the respective wheels of a vehicle;
   a step of estimating, based on the wheel rotation speed information obtained in the step of detecting the rotation speed information, a frequency characteristic of the wheel rotation speed information; and a step of determining, based on the estimated frequency characteristic, a tire having a decreased air pressure wherein the step of estimating the frequency characteristic includes:

a first step of time-series estimating, with regard to a time-series signal including the wheel rotation speed information, a third order or more linear model parameter;

a second step of generating pseudo input data;

a third step of estimating, based on the linear model parameter estimated in the first step and the pseudo input data generated in the second step, output data to a linear model;

a fourth step of identifying, based on the pseudo input data and the estimated output, a linear model parameter for which the order is reduced to a second order; and a fifth step of estimating, based on the identified parameter for which the order is reduced to the second order, a resonance frequency of a tire torsional direction, and wherein the step of determining a tire having a decreased air pressure is configured to determine, based on the estimated resonance frequency of the tire torsional direction, a tire having a decreased air pressure.

8. A method of detecting a tire having a decreased air pressure including:

a step of detecting rotation speed information of the respective wheels of a vehicle;

a step of computing, based on the wheel rotation speed information obtained in the step of detecting the rotation speed information, wheel rotation acceleration information;

a step of estimating, based on the wheel rotation acceleration information computed in the step of computing the wheel rotation acceleration information, a frequency characteristic of the wheel rotation acceleration information; and a step of determining, based on the estimated frequency characteristic, a tire having a decreased air pressure wherein the step of estimating the frequency characteristic includes:

a first step of time-series estimating, with regard to a time-series signal including the wheel rotation acceleration information, a third order or more linear model parameter;

a second step of generating pseudo input data;

a third step of estimating, based on the linear model parameter estimated in the first step and the pseudo input data generated in the second step, output data to a linear model;

a fourth step of identifying, based on the pseudo input data and the estimated output, a linear model parameter for which the order is reduced to a second order; and a fifth step of estimating, based on the identified parameter for which the order is reduced to the second order, a resonance frequency of a tire torsional direction, and Wherein the step of determining a tire having a decreased air pressure is configured to determine, based on the estimated resonance frequency of the tire torsional direction, a tire having a decreased air pressure.

9. The method of claim 7 or claim 8, wherein the method further includes a step of correcting, based on the temperature information from a temperature sensor for detecting the temperature near the tire, the estimated resonance frequency of the tire torsional direction.

10. The method of claim 7 or claim 8, wherein the first step time-series estimates a third order or more linear model parameter by means of the least-squares method.

11. The method of claim 7 or claim 8, wherein the input date and output date is subjected to a filtering processing by a filter having a predetermined passband width when the fourth step identifies a second order linear model.

12. The method of claim 7 or claim 8, wherein the fourth step identifies a second order linear model by means of the least-squares method.

13. A non-transitory computer readable medium containing a program to cause a computer to execute a method comprising detecting a tire having a decreased air pressure which causes, in order to detect a tire of a running vehicle having a decreased air pressure based on a tire resonance frequency of the vehicle, said computer to function as: a frequency characteristic estimate means for estimating, based on wheel rotation speed information obtained by a wheel rotation speed information detection means for detecting rotation speed information of the respective wheels of a vehicle, a frequency characteristic of the wheel rotation speed information; and a decreased air pressure determination means for determining, based on the estimated frequency characteristic, a tire having a decreased air pressure wherein the frequency characteristic estimate means includes, to a time-series signal including the wheel rotation speed information, a parameter estimate means for performing a first step of time-series estimating a third order or more linear model parameter;

a pseudo input data generating means for performing a second step of generating pseudo input data;

an output data estimate means for performing a third step of estimating, based on the linear model parameter estimated in the first step and the pseudo input data generated in the second step, output data to a linear model;

a parameter identification means for performing a fourth step of identifying, based on the pseudo input data and the estimated output, a linear model parameter for which the order is reduced to a second order; and a resonance frequency estimate means for performing a fifth step of estimating, based on the identified parameter for which the order is reduced to the second order, a resonance frequency of a tire torsional direction, and wherein the decreased air pressure determination means is so configured as to determine a tire having a decreased air pressure based on the estimated resonance frequency of the tire torsional direction.

14. A non-transitory computer readable medium containing a program to cause a computer to execute a method comprising detecting a tire having a decreased air pressure which causes, in order to detect a tire of a running vehicle having a decreased air pressure based on a tire resonance frequency of the vehicle, said computer to function as: a wheel rotation acceleration information computing means for computing, based on the wheel rotation speed information obtained by a wheel rotation speed information detection means for detecting a rotation speed information of respective wheels of a vehicle, wheel rotation acceleration information; a frequency characteristic estimate means for estimating, based on the wheel rotation acceleration information computed by the wheel rotation acceleration information computing means, a frequency characteristic of the wheel rotation acceleration information; and a decreased air pressure determination means for determining, based on the estimated frequency characteristic, a tire having a decreased air pressure wherein the frequency characteristic estimate means includes, to a time-series signal including the wheel rotation acceleration information:

a parameter estimate means for performing a first step of time-series estimating a third order or more linear model parameter;

a pseudo input data generating means for performing a second step of generating pseudo input data;

an output data estimate means for performing a third step of estimating, based on the linear model parameter estimated in the first step and the pseudo input data generated in the second step, output data to a linear model;

a parameter identification means for performing a fourth step of identifying, based on the pseudo input data and the estimated output, a linear model parameter for which the order is reduced to a second order; and a resonance frequency estimate means for performing a fifth step of estimating, based on the identified parameter for which the order is reduced to the second order, a resonance frequency of a tire torsional direction, and wherein the decreased air pressure determination means is so configured to as determine a tire having a decreased air pressure, based on the estimated resonance frequency of the tire torsional direction.

* * * * *